May 6, 1930.   W. T. PRITCHARD   1,757,736
LUBRICATING DEVICE
Filed Oct. 1, 1926

Inventor:
William T. Pritchard
by Joel C. A. Palmer
Attorney

Patented May 6, 1930

1,757,736

UNITED STATES PATENT OFFICE

WILLIAM T. PRITCHARD, OF MAPLEWOOD, NEW JERSEY, ASSIGNOR TO BELL TELEPHONE LABORATORIES, INCORPORATED, OF NEW YORK, N. Y., A CORPORATION OF NEW YORK

LUBRICATING DEVICE

Application filed October 1, 1926. Serial No. 138,857.

This invention relates to improvements in lubricating devices and more particularly to what are commonly known as grease guns.

An object of the invention is to facilitate the adequate lubrication of small bearings and the like.

A more specific object is to improve the operating characteristics and simplify the construction of lubricating devices.

In accordance with the embodiment of the invention herein shown and described, the lubricating device comprises a cylinder having an inlet and outlet passage, a piston movable in the cylinder and a reservoir for containing the lubricant connected to the inlet passage. The forward movement of the piston serves to eject the contents of the cylinder through the outlet passage and at the same time to directly close the inlet passage without the use of valves or the like. The backward stroke of the piston reduces the pressure in the cylinder, thus allowing the pressure of the atmosphere acting on the grease in the reservoir to force the grease into the cylinder when the inlet passage is opened.

In accordance with a feature of the invention, the outlet passage is made in the form of a long tube having an opening of small area. When the pressure in the cylinder is reduced upon the backward stroke of the piston, the pressure of the atmosphere is not sufficient to force the grease from the outlet passage into the cylinder because of the small difference of pressures acting on the ends of the grease column in the outlet passage and the large resistance offered to the movement thereof by the walls of the tube, thus eliminating the need for a valve to prevent the return of grease into the cylinder. In accordance with another feature of the invention, the length of the piston stroke may be adjusted so that a desired quantity of lubricant is ejected upon each operation of the piston. A third feature is the arrangement of the outlet at right angles to the cylinder and at a small distance from the bottom thereof, whereby an air pocket is provided at the bottom of the cylinder, which assists in obtaining uniformity of action.

Figure 1:
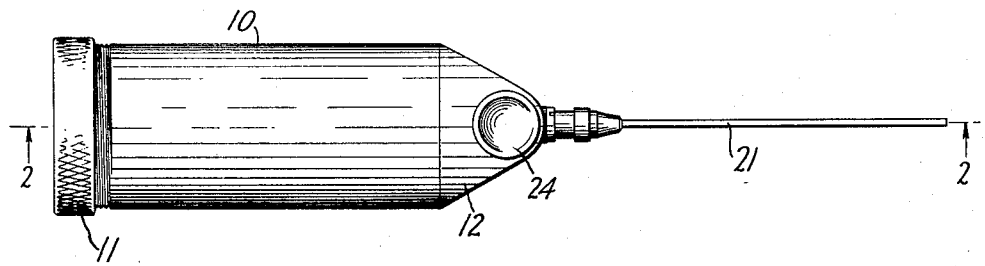
Figure 2:
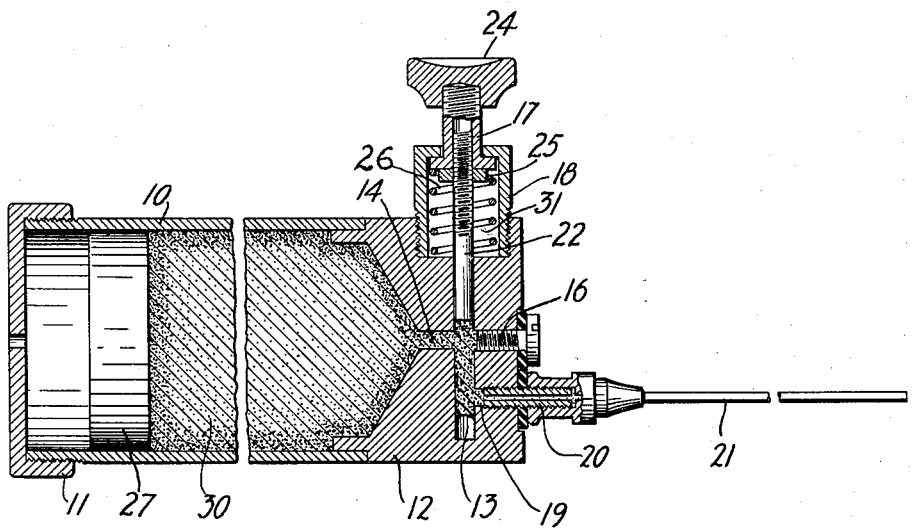

In the drawing, Fig. 1 is a plan view of a lubricating device, in accordance with the invention, and Fig. 2 is an enlarged view, partly in section, taken along the line 2—2 of Fig. 1.

Referring to the drawing in detail, a reservoir 10 provided with an apertured screw cap 11 serves as a container for a lubricant 30, such as grease. The reservoir 10 is provided at the end opposite the cap 11 with a head 12 which is formed with a transverse bore or cylinder 13 communicating with the reservoir through the longitudinal bore or inlet passage 14. Aligning with bore 14 is a threaded opening which is normally closed by a screw 16. One end of the cylinder 13 opens into a threaded chamber 31 for the reception of the cup-shaped plug 18, which is provided with an opening through which the piston rod 17 slides. Formed in the head, on an axis parallel to but offset with relation to the inlet passage 14 is an outlet passage 19 which communicates with the cylinder 13 and is fitted with a threaded nipple 20 to which a long, small bore nozzle 21 is attached.

The piston 22 is slidably fitted in the cylinder 13 and is threaded at one end to fit into the internally threaded portion of the piston rod 17. A nut 25, fitting on the threaded portion of the piston 22, is provided to lock the piston after it has been set to occupy a desired position in the cylinder. A button 24 is provided at the upper portion of the piston rod 17 so that the piston may be moved forward in the cylinder by applying pressure to the button with the thumb. A compression coil spring 26, extending between the lower portion of the chamber 31 and the lower portion of the piston rod 17, serves to move the piston on its backward stroke. The metallic disc 27 which is fitted into the reservoir so that it is free to slide therethrough, aids in rendering the device efficient in operation.

In use, the cap 11 is removed and the disc 27 is pushed out of the reservoir by means of a rod which is inserted through the opening from which the screw 16 has been removed. After replacing the screw 16 a quantity of grease is placed in the reservoir after which the disc 27 and the cap 11 are replaced. When pressure is applied to the column of grease within the reservoir, it is apparent that the grease will flow out through the inlet passage 14 and the cylinder 13 into the nipple 20 and the discharge nozzle 21 and that a small volume of air will be entrapped at the lower portion of the cylinder 13 below the outlet opening 19. Upon advancing the piston 22 into the cylinder 13, the piston acts as a cut-off for the inlet opening 14 and a quantity of grease is ejected from the end of the nozzle 21. Upon releasing the pressure on the thumb button 24, the piston is returned to its original position due to the action of the spring 26, thus creating a partial vacuum within the bore 13.

Because of the small bore nozzle 21, the total pressure acting on the column of grease in the nozzle due to the pressure of the atmosphere is small and because of its relatively great length, the frictional resistance between the grease and the wall of the nozzle is large. For these reasons, the grease in the nozzle does not flow back into the cylinder when the pressure therein is reduced below that of the atmosphere. When the end of piston 22 moves past the inlet passage 14 on its backward stroke, the atmospheric pressure acting on the column of grease in the reservoir 10 forces the grease into the cylinder 13.

The grease flowing into the cylinder 13 from the reservoir 10 does not fill the entire space in the cylinder between the lower portion of the piston 22 and the lower end of the cylinder 13, but fills such a portion of the space that the pressure acting on the entrapped air in the cylinder 13 is approximately equal to atmospheric pressure. The operation of the device is considerably improved in smoothness and accuracy, due to this entrapped air in the cylinder. When this air space is not employed the amount of grease ejected from the nozzle, upon the forward stroke of the piston is not uniform. This is believed to be caused by the leakage of air past the piston due to the relatively large difference between the pressure acting within the clylinder 13 and the pressure of the atmosphere while the piston is moved through its backward stroke. When air is entrapped in the cylinder this pressure difference is not so great and the amount of grease discharged from the nozzle is practically the same for each stroke of the piston. Other resilient means may be substituted for the air pocket. Whatever resilient means is used its correct size depends among other factors, upon the range of amounts of lubricant expelled during each piston stroke, between maximum and minimum adjustments of the piston stroke. The correct size for best results must, of course, be determined by trial. For the design shown in the drawing, the dimensions of the instrument obtainable from the drawing are suitable for good results.

The amount of grease ejected from the nozzle upon each forward stroke of the piston may be controlled by varying the effective stroke of the piston, the ineffective portion of the stroke being measured approximately by the distance between the lower portion of the piston and the lower part of the inlet passage 14 when the piston is at its uppermost position in the cylinder. The device may be adjusted for this purpose by changing the position occupied by the threaded portion of the piston in the piston rod 17.

What is claimed is:

1. A lubricating device comprising a head having inlet and outlet ports and a cylindrical bore communicating with said ports and projecting at right angles thereto, said bore having a portion extending beyond said outlet port, a hollow casing connected to said head and adapted to supply a lubricant to said bore through said inlet port, a reciprocating plunger within said bore, resilient means within said head located in the end of said bore beyond said outlet port, and elongated means extending from said outlet port of such a diameter to prevent the lubricant from being withdrawn into said bore.

2. A lubricating device comprising a head having inlet and outlet ports and a cylindrical bore communicating with said ports and projecting at right angles thereto, said bore having a portion extending beyond said outlet port to form a pocket for entrapped air, a hollow casing connected to said head and adapted to supply a lubricant to said bore through said inlet port, a reciprocating plunger within said bore, and elongated means extending from said outlet port of such a diameter to prevent the lubricant from being withdrawn into said bore.

In witness whereof, I hereunto subscribe my name this 30th day of September A. D., 1926.

WILLIAM T. PRITCHARD.